United States Patent [19]

Hashimoto et al.

[11] Patent Number: 4,486,818

[45] Date of Patent: Dec. 4, 1984

[54] APPARATUS FOR CONTROLLING OPENING AND CLOSING OF A RETRACTABLE HEAD LAMP FOR AN AUTOMOBILE

[75] Inventors: Kenshiro Hashimoto, Mitaka; Kunio Okazaki, Hadano; Toru Tanabe; Toshio Koguro, both of Yokohama, all of Japan

[73] Assignees: Honda Motor Co., Ltd.; Stanley Electric Co., Ltd., both of Tokyo, Japan

[21] Appl. No.: 524,127

[22] Filed: Aug. 16, 1983

[30] Foreign Application Priority Data

Aug. 27, 1982 [JP] Japan .................................. 57-148602

[51] Int. Cl.³ .............................................. B60Q 1/06
[52] U.S. Cl. ........................................ 362/65; 362/66; 362/272; 362/295; 315/82; 307/10 LS
[58] Field of Search .................... 362/65, 66, 272, 295; 315/82; 307/10 LS

[56] References Cited

U.S. PATENT DOCUMENTS 3,601,594  8/1971  Carbary .................................. 362/64
4,282,561  8/1981  Yano ...................................... 362/65

Primary Examiner—Stephen J. Lechert, Jr.
Attorney, Agent, or Firm—Frishauf, Holtz, Goodman & Woodward

[57] ABSTRACT

Apparatus for opening and closing a retractable head lamp which includes a hand operated switch for effecting lighting and unlighting of the head lamp and initiating opening and closing movements of the head lamp, motor for driving a retracting mechanism for opening and closing the head lamp and a detector for detecting a desired position (opened and/or closed) of the head lamp and for selectively stopping energization of the motor when the head lamp reaches a desired position. A control means is connected between the hand switch and the detecting means and is responsive to operation of the hand switch from a lighting position substantially instantaneously to an unlighting position to prevent energization of the motor, thereby preventing closing of the previously opened head lamp. The control means is also responsive to operation of the hand switch from an unlighting position substantially instantaneously to a lighting position thereof to energize the motor and to maintain energization of the motor until the retractable head lamp is driven to its fully opened position, thereby preventing stopping of the retractable head lamp at a partially open position. The control means preferably comprises a transistor switching circuit with an RC timer.

8 Claims, 2 Drawing Figures

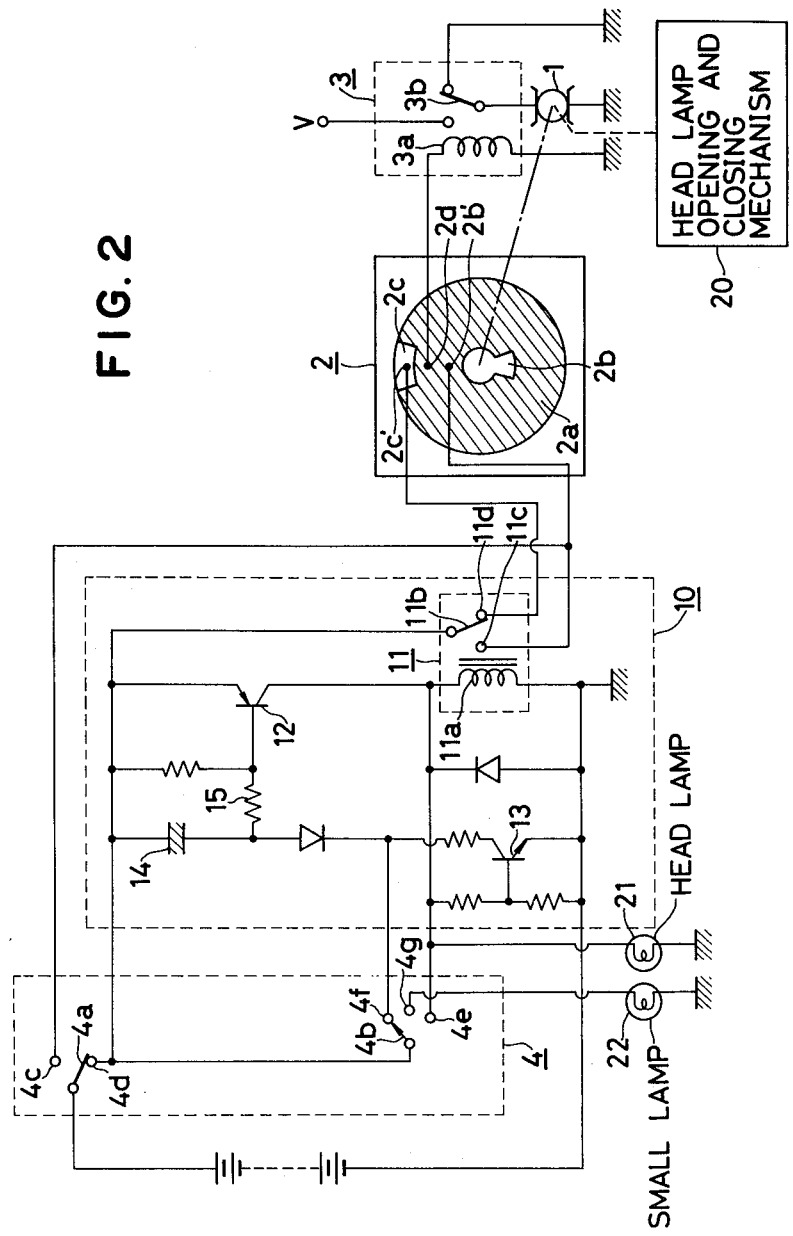

4,486,818

APPARATUS FOR CONTROLLING OPENING AND CLOSING OF A RETRACTABLE HEAD LAMP FOR AN AUTOMOBILE

BACKGROUND OF THE INVENTION

This invention relates to an apparatus for controlling the opening and closing of a retractable head lamp, and more particularly, to such an apparatus in which a normal position of the head lamp is positively held even if an instantaneous opening signal or closing signal is applied.

Retractable head lamps for automobiles generally have a problem in that the head lamp is sometimes stopped in its slightly open condition or in such a position that the lamp tends to be closed from its fully open condition. Head lamps of the retractable type form a part of an outer surface of a vehicle body, and therefore, the external appearance thereof is impaired when the lamp is in a half-open or partially open condition. If forcible pressing of a half-open or partially open lamp is applied from the outside, the opening and closing mechanism thereof may possibly be damaged.

FIG. 1 shows an example of a conventional apparatus for controlling the opening and closing of a retractable head lamp. This conventional apparatus comprises a motor 1 for opening and closing a head lamp via an opening and closing mechanism 20 (schematically shown), a position detecting member 2 which is rotated by the power of the motor 1, a relay circuit 3 for cutting off energization of the motor 1 when the position detecting member 2 detects the open position or closed position of the head lamp, and a manually operable hand switch 4. The hand switch 4 comprises a movable element 4a, a terminal 4c for transmitting a forced head lamp opening signal in response to the movable element 4a contacting terminal 4c, a normal terminal 4d, a movable element 4b, a terminal 4e for transmitting a lighting and opening signal of the head lamp 21 in response to the movable element 4b contacting terminal 4e, a small lamp (i.e. parking lamp) lighting terminal 4f, and a terminal 4g for transmitting closing signal of the head lamp responsive to the movable element 4b contacting terminal 4g (the headlamp 21 is turned off when movable element 4b is moved to terminal 4g).

The position detecting member 2 comprises a circular sliding surface 2a having one surface formed of a conductor (hatched portion in FIG. 1), an opening signal stopping portion 2b in which an outer circumferential portion of the conducting sliding surface 2a is cut away to form an insulating portion, and a closing signal stopping portion 2c (insulating portion) formed by similar means in an outer circumferential direction from the center. A contact 2b' connected to the terminal 4e of hand switch 4 is in contact with an outer circumferential portion of the sliding surface 2a including the opening signal stopping portion 2b, and a contact 2c' connected to the terminal 4g is in contact with a portion of sliding surface 2a including the opening signal stopping portion 2c. A further contact 2d is connected to a relay coil 3a of the relay 3 and assumes a position in contact with the conducting portion of sliding surface 2a irrespective of the position of the detecting member 2.

The head lamp opening and closing mechanism 20 may be a conventional linkage-type mechanism such as that shown in U.S. Pat. No. 4,282,561, issued Aug. 4, 1981, the contents of which are incorporated herein by reference.

Accordingly, if the movable element 4b of the hand switch 4 is switched from the illustrated position (when the retractable head lamp is in the open position and when the head lamp 21 is lit) to the terminal 4g, the head lamp 21 is turned off and the relay coil 3a is energized (via contact 2d) to connect the movable contact 3b of relay 3 to the power source V, as a consequence of which the motor 1 is driven to move the head lamp to the closed position via mechanism 20. This operation remains in effect until the closing signal stopping portion 2c reaches the position of the contact 2c' by rotation of the position detecting member 2 which is coupled to the motor 1. At this point, contact 2c' is no longer electrically connected to contact 2d and the relay 3 is de-energized to stop the motor 1. This stopped position is the position where the head lamp is in the fully closed condition.

When the movable element 4b is switched from the terminal 4g to the terminal 4e, the head lamp 21 lights and the relay coil 3a is energized through the contacts 2b' and 2d, as a consequence of which the motor 1 is driven via power source V and then stops when the opening signal stopping portion 2b of the position detecting member 2 reaches the contact 2b' in a manner similar to that as described above. This stopped position is the position where the head lamp is in the fully open condition. It is noted that when the movable element 4b is switched from the terminal 4e to the terminal 4f, the head lamp 21 is extinguished and the small lamp 22 (i.e. parking lamp) is lit, the other operating conditions remaining unchanged.

The movable element 4a is provided to bring the head lamp into the open condition irrespective of the position of the movable element 4b, and this action can be achieved by switching the movable element 4a to the terminal 4c.

As described above, the conventional control apparatus of FIG. 1 can fulfill the function generally required of the retractable head lamp. However, in the case when the hand switch 4 is instantaneously operated, for example, suppose that the head lamp is open (FIG. 1 position) and that the movable element 4b is quickly or instantaneously switched to the terminals 4e→4g→4e, the motor 1 is driven instantaneously and therefore, the head lamp tends to be driven to the closed condition and the position detecting member 2 is also rotated by a small amount. Since this is a matter of instantaneous operating, the contact 2b' therefore stays within the region of the opening signal stopping portion 2b. But, the head lamp becomes stopped at an uncertain position where the head lamp is slightly closed from the normal fully open position. This means that the head lamp is not properly aimed. A similar inconvenience occurs when the head lamp is fully closed and the movable element 4b is instantaneously switched from the terminal 4g to the terminal 4e and then back to terminal 4g. In such a case, the relay coil 3a is instantaneously energized through the contacts 2b' and 2d with the result that the motor 1 is instantaneously driven and the head lamp is slightly moved toward its open position, whereas the contact 2c' stays within the region of the closing signal stopping portion 2c. Thus, the head lamp is off, but becomes stopped in a position where the head lamp is slightly moved toward its open position, whereas the contact 2c' stays within the region of the closing signal stopping portion 2. Thus, the head lamp is off, but becomes stopped in a position where the head lamp is slightly open. This impairs the appearance of the vehicle and if the head lamp is manually pressed toward the fully closed position, damage to the operating mechanism may occur.

SUMMARY OF THE INVENTION

In apparatus for opening and closing of a retractable head lamp wherein a motor drives the retractable head lamp for opening and closing the retractable head lamp, a hand switch is provided for effecting lighting and unlighting of the head lamp and for initiating opening and closing movements of the head lamp and a detecting means is provided for detecting a desired position of the head lamp and for selectively stopping energization of the motor when the head lamp reaches a desired position; the improvement comprising control means interposed between the hand switch and the detecting means, and being responsive to operation of the hand switch from a lighting position substantially instantaneously to an unlighting position to prevent energization of the motor; and the control means being further responsive to operation of the hand switch from an unlighting position thereof substantially instantaneously to a lighting position thereof to energize said motor and to maintain energization of said motor until the retractable head lamp is driven to its fully opened position, thereby preventing stopping of said retractable head lamp at a partially open position.

BRIEF DESCRIPTION OF THE DRAWINGS

FIG. 2 is a circuit diagram of an apparatus for controlling opening and closing of a retractable head lamp in accordance with the present invention.

DETAILED DESCRIPTION

Figure 1:
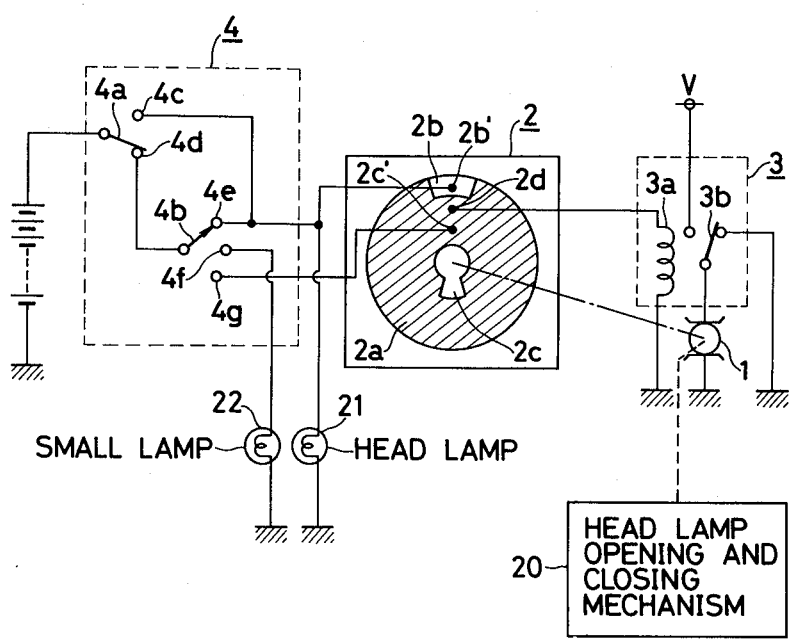
FIG. 1 is a circuit diagram of a prior art apparatus.

The present invention will be described in detail below by way of an embodiment shown in FIG. 2. Like or similar corresponding parts in FIG. 1 are designated by like reference characters in FIG. 2. A control circuit apparatus 10 in accordance with the present invention is interposed between the hand switch 4 and the position detecting member 2. The control circuit 10 has the function of eliminating the problem of the retractable head lamp moving away from the desired fully open or fully closed position when the movable element 4b of the hand switch is instantaneously operated to another terminal. The control circuit 10 comprises a relay circuit 11 which effects switching whether an opening signal or a closing signal is fed to the retractable head lamp mechanism in response to the position of the movable element 4b of the hand switch 4. The relay circuit 11 is designed so that when the movable element 4b of hand switch 4 is switched to the terminal 4e, the head lamp 21 lights and a relay coil 11a is energized so that a movable contact 11b of relay 11 is switched from a closing signal terminal 11d to an opening signal terminal 11c. The other end of the movable contact 11b is connected to a power source through the movable element 4a of hand switch 4. The relay coil 11a is connected in series with a driving transistor 12 which is turned on when the movable element 4b is switched to the terminal 4e to energize the relay coil 11a. The driving transistor 12 is connected so that it is maintained in its ON condition by a self-holdng transistor 13 which is turned on under the same condition (i.e. when movable element 4b is switched to the terminal 4e). Capacitor 14 and resistor 15 form a timer, the capacitor 14 being connected in series with the self-holding transistor 13, and the resistor 15 being connected to that a base current of the driving transistor 12 flows into a collector terminal of the self-holding transistor 13. The timer comprised of the capacitor 14 and the resistor 15 functions such that even if the movable element 4b is operated so as to be instantaneously switched between the terminals 4g→4e→4g or between the terminals 4e→4g→4e, due to the electrical charge of the capacitor 14, which is charged when the self-holding transistor 13 is turned on, the driving transistor 12 is turned on or held in the ON condition, depending upon its prior condition. This eliminates generation of uncertain opening and closing signals which may possibly cause retracting mechanism 20 to stop in the middle of a cycle. This prevents the head lamp from being in a position other than its fully open or fully closed position.

The operation of the present invention will be described hereinafter by way of specific examples.

EXAMPLE (1)

Where the retractable head lamp is forcibly partially opened from its closed position The movable element 4a of the hand switch 4 merely need be switched to the terminal 4c (opening position) whereby the contact 2b' and contact 2d are electrically connected via conducting surface 2a so that the relay coil 3a of the relay circuit is energized to connect the contact 3b to the power source V. As a consequence, the motor 1 is energized and is driven to fully open the head lamp. At this time, since the position detecting member 2 is coupled to motor 1, it is also rotated and the opening signal stopping portion 2b reaches the position of the contact 2b' to stop driving of the motor. This causes the head lamp mechanism to open the head lamp to the fully opened position.

EXAMPLE (2)

To cause the head lamp to normally assume its open position and to be lighted

The movable element 4b of the hand switch 4 is switched to the terminal 4e (opening and head lamp lighting position). Thereby, the head lamp is lighted and the relay coil 11a of the relay circuit 11 is energized, as a consequence of which the movable relay contact 11b is switched to the opening signal terminal 11c and the head lamp is caused to assume its open position. This operation is the same as that previously described. At this time, in the control apparatus 10, the self-holding transistor 13 is first turned on, the capacitor 14 is charged and the driving transistor 12 is also turned on. In this condition, even if the movable element 4b of hand switch 4 is switched to the small lamp lighting terminal 4g, a part of the collector current of the driving transistor 12 is turned into a base current of the self-holding transistor 13 to thereby form a self-holding circuit, and the relay coil 11a is maintained in the energized condition and the contact 11b is not switched away from opening signal terminal 11c. Thus, the mechanism 20 can complete its cycle to drive the head lamp to its fully open position.

Furthermore, even if the movable element 4b is erroneously switched instantaneously among the terminals 4e (or 4f)→4g→4e in the above-described lighted condition, the electrical charge of the capacitor 14 is discharged through the driving transistor 12 and resistor 15, and therefore, the driving transistor 12 is maintained in its ON condition for a while (until capacitor 14 discharges), and the contact 11b of the relay circuit 11 is not switched to the closing signal terminal 11d because of the above-described erroneous operation. Thus, the head lamp is driven to and remains at its fully opened and lit condition. As a result, there occurs no inconvenience whereby the retractable head lamp becomes stopped in the condition wherein the head lamp tends to be slightly closed.

EXAMPLE (3)

Where the head lamp is made to assume its closed position and is unlighted

The movable element 4b of the hand switch 4 is switched to the terminal 4f (the position shown in FIG. 2). Thereby, the head lamp is turned off and the relay coil 11a of the relay coil 11 is deenergized, as a consequence of which the movable relay contact 11b is switched to the closing signal terminal 11d. This causes the head lamp to assume its closed position since in the position detecting member 2, the contacts 2c' and 2d are electrically connected together through the conducting sliding surface 2a and therefore, the relay coil 3a of the relay circuit 3 is energized and the movable relay contact 3b is positioned on the power source side to hold the motor 1 in the energized driving condition. Then, the closing signal stopping portion 2c of the position detecting member 2 reaches the position of the contact 2c' and the relay 3 is deenergized, thereby causing the motor 1 to stop. This position is the fully closed position of the head lamp. At this time, the control apparatus 10 assumes its OFF condition together with the driving transistor 12 and the self-holding transistor 13 as the movable element 4b operates.

Moreover, if the movable element 4b of the hand switch 4 is operated to be switched instantaneously to the terminals 4e→4g in the above-described unlighted condition, the capacitor 14 is charged when the movable element 4b is switched to the terminal 4e, and therefore, even if the movable element 4b is returned to the terminal 4g, the driven transistor 12 is turned on by the discharge current of the capacitor 14, the relay coil 11a of the relay circuit 11 is energized, and the contact 11b thereof is switched to the opening signal terminal 11c. While the energizing time of the relay coil 11 is a short time required until the electrical charge of the capacitor 14 is discharged, the motor 1 is energized and driven and the position detecting member 2 is also rotated during that period of time. Thereafter, even if the relay coil 11a of the relay circuit 11 is deenergized to return the movable relay contact 11b to the opening signal terminal 11d, the contact 2c' reaches the conducting sliding surface 2a beyond the region of the closing signal stopping portion 2c, and therefore, the motor 1 is kept energized and stops only when the head lamp is fully closed.

Accordingly, there occurs no inconvenience in that the motor stops with the head lamp mechanism in a middle position. It will be noted that the above descriptions in connection with EXAMPLES (2) and (3) were made for the case where the movable element 4a of the hand switch 4 is positioned at the terminal 4d.

As described above, in the present invention, even if the hand operating switch 4 which lights or unlights or simultaneously permits the retractable head lamp to assume its open or closed position is instantaneously operated to undesired terminals or positions, no inconvenience occurs wherein the head lamp is partially open or partially closed. Therefore, the present apparatus has the advantages of eliminating the so-called half-open or partially open conditions. This overcomes the poor external appearance due to a half-open or partially open condition, and prevents trouble or damage to the head lamp opening and closing mechanism resulting from careless application of pressing forces and weight.

We claim:

1. In apparatus for opening and closing a retractable head lamp comprising a retractable head lamp; motor means coupled to said retractable head lamp for opening and closing said retractable head lamp; a hand switch for effecting lighting and unlighting of said head lamp and for initiating opening and closing movements of said head lamp; and detecting means coupled to said hand switch and to said motor means for detecting at least one desired position of said head lamp for selectively stopping energization of said motor means when said head lamp reaches said at least one desired position, the improvement comprising:
   control means interposed between said hand switch and said detecting means, said control means including:
      means responsive to operation of said hand switch from a lighting position thereof substantially instantaneously to an unlighting position thereof to prevent energization of said motor means, thereby preventing said motor from instantaneously driving said retractable head lamp away from its fully open position; and
      means responsive to operation of said hand switch from an unlighting position thereof substantially instantaneously to a lighting position thereof to energize said motor means and to maintain energization of said motor means until the retractable head lamp is driven to its fully opened position, thereby preventing stopping of said retractable head lamp at a partially open position.

2. The apparatus of claim 1, wherein said hand switch includes means for selectively generating an opening signal and a closing signal; and wherein the apparatus further comprises a relay circuit coupled to said motor means for effecting a switching operation to control said motor means responsive to either one of an opening signal and a closing signal which are generated responsive to operation of said hand switch.

3. The apparatus of claim 1, wherein said control means has at least two stable conditions, and comprises self-holding means for maintaining said control means in a given one of said stable conditions; and timing means coupled to said self-holding means for supplying a drive signal to said self-holding means for a predetermined period of time responsive to operation of said hand switch, to thereby maintain said control means in said given one of said stable conditions for said predetermined period of time.

4. The apparatus of claim 3, wherein
   said head lamp has two desired positions, an open position and a closed position;
   said detecting means comprises first means for deenergizing said motor means when said head lamp reaches one of said desired positions; second means for energizing said motor means responsive to receipt of a signal for moving said head lamp to the other of said desired positions; said first means maintaining its motor deenergized condition for a predetermined period of time after re-energization of said motor means by said second means; and said timing means supplying said drive signal to said self-holding means for a period of time which is greater than the period of time said first means maintains its said motor deenergized condition.

5. The apparatus of claim 3, wherein said control means further comprises a switching means coupling said hand switch to said motor means, said switching means having two stable conditions, said self-holding means being coupled to said switching means to maintain said switching means in at least one of said two stable conditions responsive to said drive signal from said timing means.

6. The apparatus of claim 5, wherein said timing means includes means for preventing switching of said switching means from said one stable condition to the other of said two stable conditions for a given period of time.

7. The apparatus of claim 5, wherein
said switching means comprises a first transistor circuit;
said self-holding means comprises a second transistor circuit coupled to said first transistor circuit; and
said timing means comprises an RC timing circuit coupled to said first transistor circuit and to said second transistor circuit.

8. The apparatus of claim 7, wherein said hand switch comprises a manually movable element and at least first and second fixed terminals, said first fixed terminal supplying an opening signal and said second fixed terminal supplying a closing signal, said first transistor circuit being responsive to said opening signal to turn said first transistor circuit ON to energize said motor means and to thereby open said head lamp.

* * * * *